United States Patent [19]

Postma et al.

[11] Patent Number: 5,764,453
[45] Date of Patent: Jun. 9, 1998

[54] METHOD OF MANUFACTURING A THIN-FILM MAGNETIC HEAD, AND MAGNETIC HEAD MANUFACTURED BY MEANS OF SAID METHOD

[75] Inventors: Lambertus Postma, Eindhoven; Arie J. Van Straalen, Veldhoven; Gerardus H.J. Somers, Eindhoven, all of Netherlands

[73] Assignee: U.S. Philips Corporation, New York, N.Y.

[21] Appl. No.: 749,435

[22] Filed: Nov. 15, 1996

Related U.S. Application Data

[63] Continuation of Ser. No. 355,466, Dec. 14, 1994.

[30] Foreign Application Priority Data

Dec. 17, 1993 [BE] Belgium ................ 09301411

[51] Int. Cl.$^6$ ............... G11B 5/167; G11B 5/127; G11B 5/33; H01F 7/06
[52] U.S. Cl. ............... 360/126; 360/113; 29/603.1; 29/603.11
[58] Field of Search ............... 360/126, 113, 360/119; 29/603, 603.1, 603.07, 603.11, 603.13, 603.14, 603.15

[56] References Cited

U.S. PATENT DOCUMENTS

| | | | |
|---|---|---|---|
| 4,796,132 | 1/1989 | Dekura et al. | 360/113 |
| 5,111,352 | 5/1992 | Das et al. | 360/113 |
| 5,255,141 | 10/1993 | Valstyn et al. | 360/113 |
| 5,274,521 | 12/1993 | Miysuchi et al. | 360/119 |
| 5,284,572 | 2/1994 | Somers et al. | 29/603 |
| 5,375,023 | 12/1994 | Ju et al. | 360/126 |

FOREIGN PATENT DOCUMENTS

| | | |
|---|---|---|
| 0404332 | 12/1990 | European Pat. Off. |
| 0445883 | 9/1991 | European Pat. Off. |
| 0472187 | 2/1992 | European Pat. Off. |
| 0516022 | 12/1992 | European Pat. Off. |

*Primary Examiner*—Stuart S. Levy
*Assistant Examiner*—Adriana Giordana
*Attorney, Agent, or Firm*—John C. Fox; Norman N. Spain

[57] ABSTRACT

Method of manufacturing a thin-film magnetic head provided with a transducing element (23) and at least one flux-guiding element (17a, 17b). An electrically conducting layer (8) of a non-magnetic material and a second electrically insulating layer (9) of a non-magnetic material are successively formed on a first electrically insulating layer (5) of a non-magnetic material. The second electrically insulating layer is subsequently provided with at least an interruption exposing a portion of the electrically conducting layer. Subsequently, the flux-guiding element is formed by electrodepositing a soft-magnetic material on said portion until the interruption is filled, whereby the flux-guiding element and the second electrically insulating layer constitute an at least substantially plane surface on which an electrically insulating spacer layer (21) is formed. Subsequently, the transducing element is provided on the spacer layer. The magnetic head thus formed has a non-magnetic transducing gap (35) terminating in a head face (33) and being constituted by the first electrically insulating layer (5) and the electrically conducting layer (8).

17 Claims, 5 Drawing Sheets

METHOD OF MANUFACTURING A THIN-FILM MAGNETIC HEAD, AND MAGNETIC HEAD MANUFACTURED BY MEANS OF SAID METHOD

This is a continuation of application Ser. No. 08/355,466, filed Dec. 14, 1994.

BACKGROUND OF THE INVENTION

The invention relates to a method of manufacturing a thin-film magnetic head provided with a transducing element and at least one flux-guiding element, which method starts from a substrate.

A method of manufacturing a thin-film magnetic head is known from EP-A 0 516 022 (herewith incorporated by reference). The magnetic head obtained by means of this known method is an integrated magnetic head provided with a contact face and comprising an inductive part and a magnetoresistive part. In accordance with the known method, two flux guides of an amorphous material based on Co are provided on a non-magnetic substrate, while an aperture present between the two flux guides is filled with a first insulation layer of $SiO_2$. The surface formed by the flux guides and the first insulation layer is provided with a second structured insulation layer on which subsequently a magnetoresistive (MR) element is formed. The MR element is then coated with a third structured insulation layer on which subsequently a bias winding is formed. To coat the bias winding, a fourth structured insulation layer is then provided. Subsequently, a magnetic core layer of a Co-based material is formed, which layer is in contact with one of the flux guides via apertures in the three last-mentioned insulation layers. The areas which are not coated by the core layer are filled with a filling layer of $Al_2O_3$, whereafter a surface on which an inductive element is formed is obtained by a mechanical operation.

The known method comprises a relatively large number of process steps for manufacturing at least the magnetoresistive part of the magnetic head. Moreover, there is a great risk of irregularities in the surface formed by the flux guides and the first insulation layer, necessitating the use of a relatively thick second insulation layer in order to ensure a reliable electrical insulation between the MR element and the flux guides. However, such an insulation layer has a negative influence on the efficiency of the magnetic head.

OBJECTS AND SUMMARY OF THE INVENTION

It is an object of the invention to provide a method of manufacturing a reliable and efficient thin-film magnetic head provided with a transducing element and at least one flux-guiding element, requiring only a small number of steps.

To this end the method according to the invention is characterized in that an electrically conducting layer of a non-magnetic material and a second electrically insulating layer of a non-magnetic material are successively formed on a first electrically insulating layer of a non-magnetic material, said second electrically insulating layer being provided with at least an interruption exposing a portion of said electrically conducting layer, whereafter the flux-guiding element is formed by electrodepositing a soft-magnetic material on said portion until the interruption is filled, whereby the flux-guiding element and the second electrically insulating layer constitute a surface on which an electrically insulating spacer layer is formed, whereafter the transducing element is provided.

In the method according to the invention, which comprises only a limited number of steps, the interruption in the second electrically insulating layer of, for example $SiO_2$ or $Al_2O_3$, can be simply obtained by removal of material, for example by etching. In the interruption obtained a soft-magnetic material, preferably an NiFe alloy such as $Ni_{80}F_{20}$, is deposited in a controllable manner by means of an electrodeposition process on the electrically conducting layer of a non-magnetic material, such as Au, serving as a plating base. In principle, all soft-magnetic materials to be electrodeposited can be used for forming the flux-guiding element such as, for example a CoFeP alloy such as $Co_{80}Fe_3P_{17}$, or an NiFeCu alloy such as $Ni_{79}Fe_{19}Cu_2$. The magnetic flux-guiding element obtained by electrodeposition is countersunk in the second electrically insulating layer. It has surprisingly been found that, while using the second electrically insulating layer as a reference, it is possible in the manner described above to discontinue the deposition process at such an instant that there are no or hardly any differences in height between the face of the flux-guiding element remote from the substrate and the face of the second electrically insulating layer remote from the substrate. Consequently, said surface formed by the flux-guiding element and the second electrically insulating layer is at least substantially plane. This is of particular importance in connection with the thickness of the spacer layer to be provided on this surface, which spacer layer is necessary to prevent electrical contact between the flux-guiding element and the transducing element, particularly a magnetoresistive (MR) element.

A drawback of a magnetic head having a spacer layer which is present between an MR element and a magnetic flux guide may be that only a part of the magnetic flux coming from a magnetic recording medium during operation is guided through the MR element due to the distance, caused by the thickness of the layer, between the MR element and the flux guide. From a point of view of efficiency it is therefore of essential importance that such a layer can be kept as thin as possible. Since the thickness of the spacer layer is determined to a large degree by the planeness of the surface on which the spacer layer is to be provided, the spacer layer may be very small when the method according to the invention is used, without the risk of short-circuits. It has been found by experiment that a spacer layer having a minimum thickness of 0.2 μm constitutes a reliable electrical insulation between the flux-guiding element and the transducing element when the method according to the invention is used. The transducing element may be simply formed by depositing magnetoresistive material, for example an NiFe alloy, on the thin spacer layer, for example by means of known techniques such as sputtering deposition or vapour deposition. The MR element formed may be provided with contact faces for realising electrical connections with a read device. Satisfactorily electrically conducting equipotential strips for linearizing the behaviour of the MR element can be provided on the magnetoresistive layer formed.

An embodiment of the method according to the invention is characterized in that the second electrically insulating layer is provided with a further interruption exposing a further portion of the electrically conducting layer, whereafter a soft-magnetic material is electrodeposited in the further interruption for forming a further flux-guiding element. In this embodiment the interruption and the further interruption are preferably formed simultaneously, preferably by removal of material such as etching. Moreover, soft-magnetic material is electrodeposited in said interruption and during one and the same electrodeposition process. In this way a magnetic head provided with two flux guides is obtained in an efficient manner.

An embodiment of the method according to the invention is characterized in that the substrate is formed from a magnetically permeable material, with the first electrically insulating layer being directly formed on the substrate. The use of a substrate of magnetically permeable material, preferably a ferrite such as an NiZn ferrite or an MnZn ferrite, has the advantage that the substrate can be used as a magnetic flux guide. This involves a reduction of the number of production steps. Moreover, the ferrite contributes to the stability of the magnetoresistive element and the sensitivity to external interference magnetic fields is reduced.

It is to be noted that EP 0 445 883 (PHN 13.265; herewith incorporated by reference) discloses a known method of manufacturing a thin-film magnetic head, using an electrodeposition process for forming flux guides. In this known method a plating base is provided on a magnetic support, on which subsequently photoresist walls are formed, whereafter magnetic layer parts are electrodeposited on the plating base in the spaces between the photoresist walls. Subsequently, an electrically insulating protective layer and photoresist layers are successively provided on the intermediate product obtained. Then a structuring treatment is carried out by means of an etching process in which the photoresist walls and the portion of the protective layer are removed for forming the flux guides. Subsequently, an electric insulation layer and a magnetoresistive element are provided after non-magnetic material has been deposited between the flux guides and the remaining portions of the protective layer have been removed. This known method comprising many steps is completely different from the method according to the invention.

The invention also relates to a thin-film magnetic head manufactured by means of the method according to the invention.

A first modification of the thin-film magnetic head according to the invention has a head face for cooperation with a magnetic recording medium, with a non-magnetic transducing gap terminating in the head face and constituted by an electrically insulating layer and an electrically conducting layer. This magnetic head has at least one flux-guiding element obtained by electrodeposition and preferably having a thickness of approximately 0.4–0.8 µm.

A second modification of the thin-film magnetic head according to the invention has a thin-film structure with a head face for cooperation with a magnetic recording medium, in which the thin-film structure comprises two spaced flux-guiding elements and a magnetoresistive element bridging said space, with one of the flux-guiding elements and a transducing gap terminating in the head face, said transducing gap being constituted by an electrically insulating layer of a non-magnetic material and an electrically conducting layer of a non-magnetic material. This magnetic head has two flux-guiding elements obtained by electrodeposition and preferably having a thickness of approximately 0.4–0.8 µm. An electrically insulating spacer layer of preferably approximately 0.2 µm is present between the flux-guiding elements on the one hand and the magnetoresistive element on the other hand. As compared with a layer thickness of at least approximately 0.5 µm required for a non-planar structure, this yields an efficiency improvement of at least approximately one hundred percent.

BRIEF DESCRIPTION OF THE DRAWINGS

These and other aspects of the invention will be apparent from and elucidated with reference to the embodiments described hereinafter.

In the drawings

DESCRIPTION OF THE PREFERRED EMBODIMENTS

Figure 1:
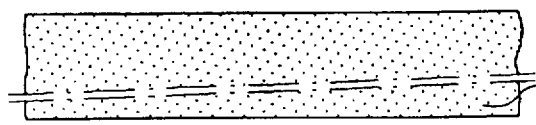
FIGS. 1 to 14 show various steps of an embodiment of the method according to the invention.
Figure 2:
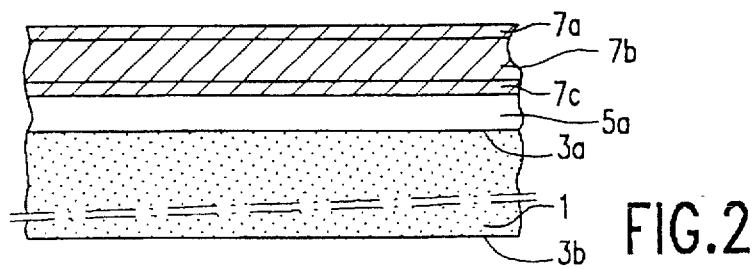
Figure 3:
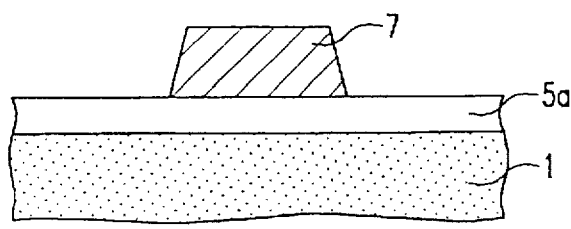
Figure 4:
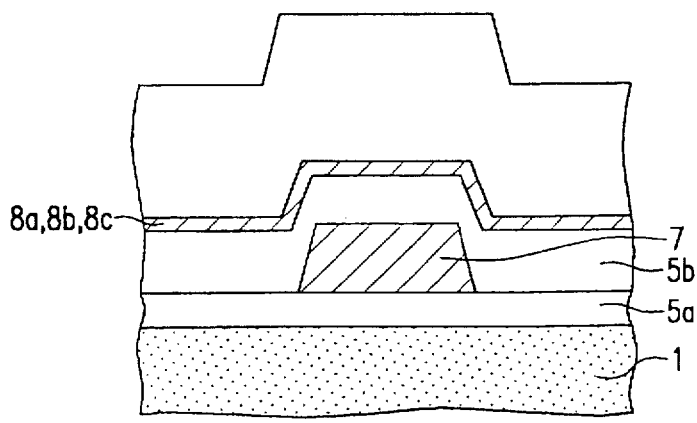
Figure 5:
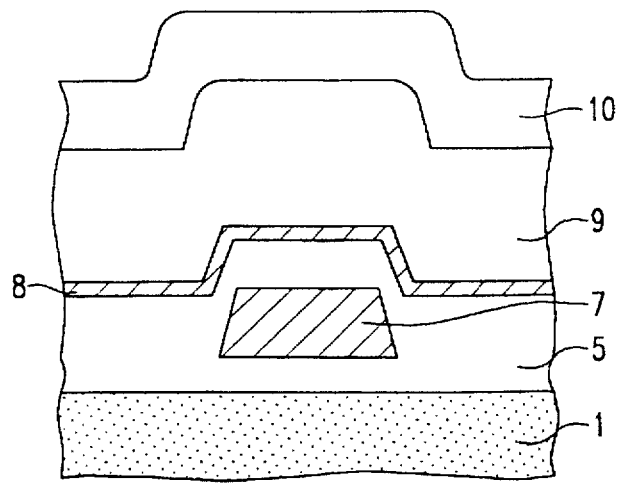
Figure 6:
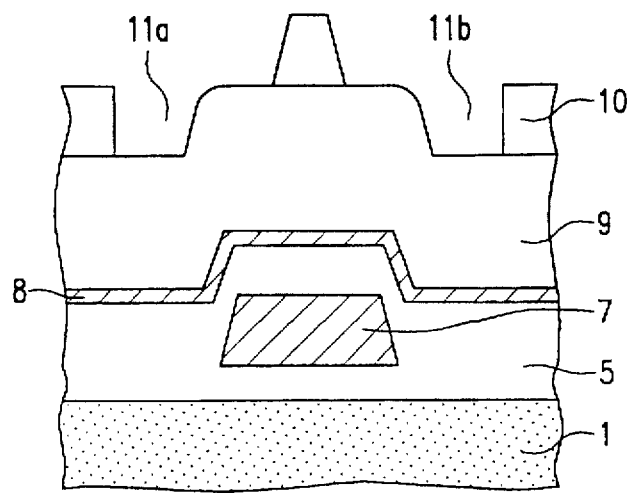
Figure 7:
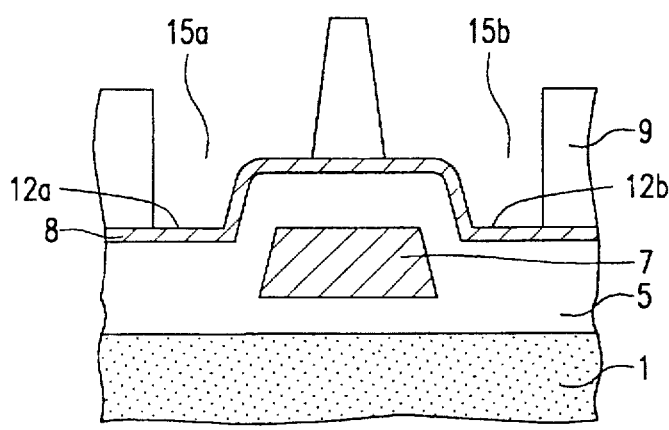
Figure 8:
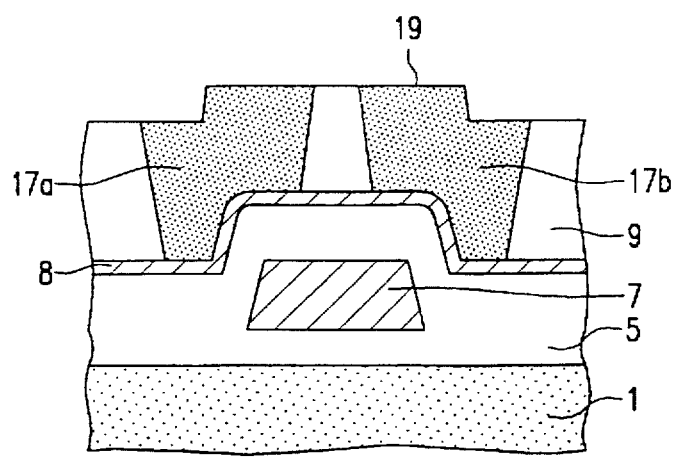
Figure 9:
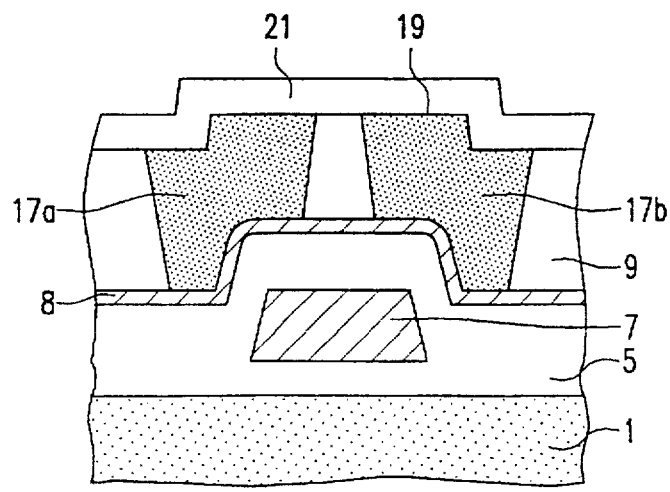
Figure 10:
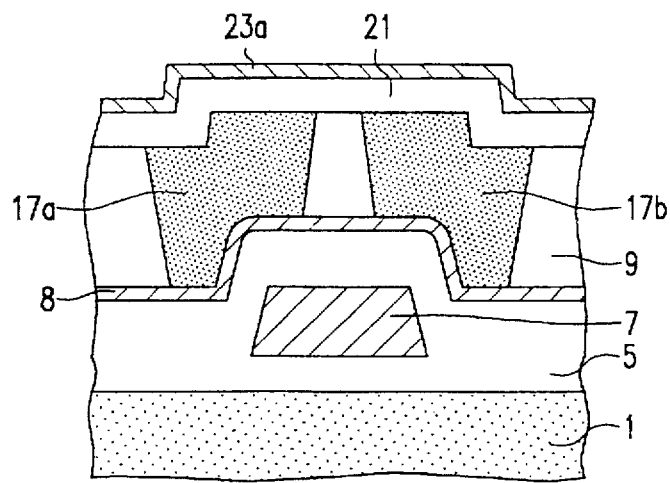
Figure 11:
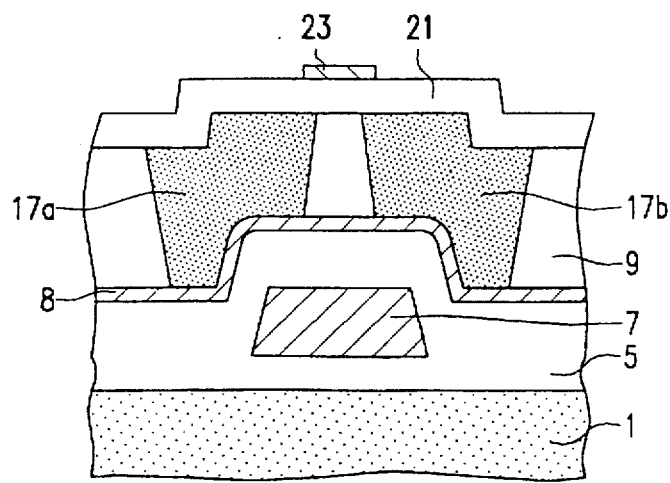
Figure 12:
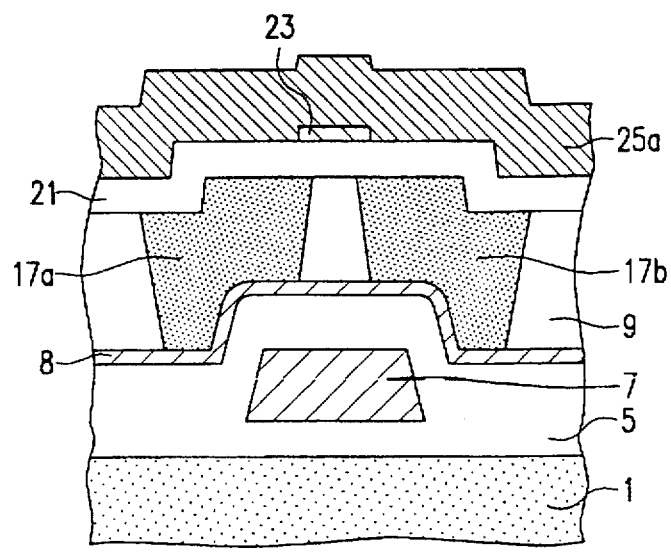
Figure 13:
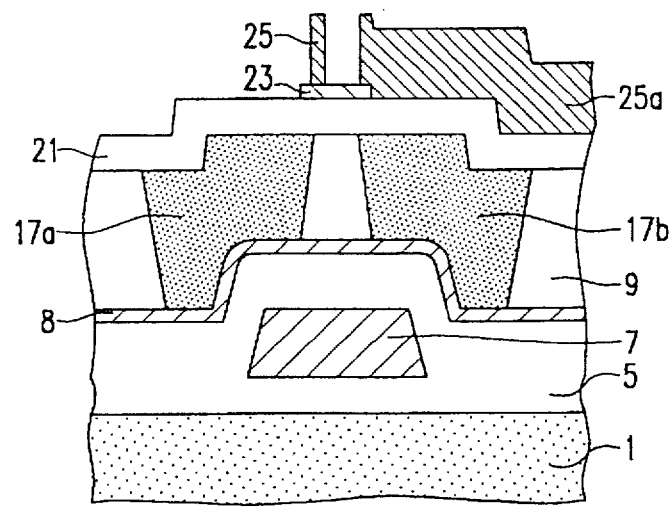
Figure 14:
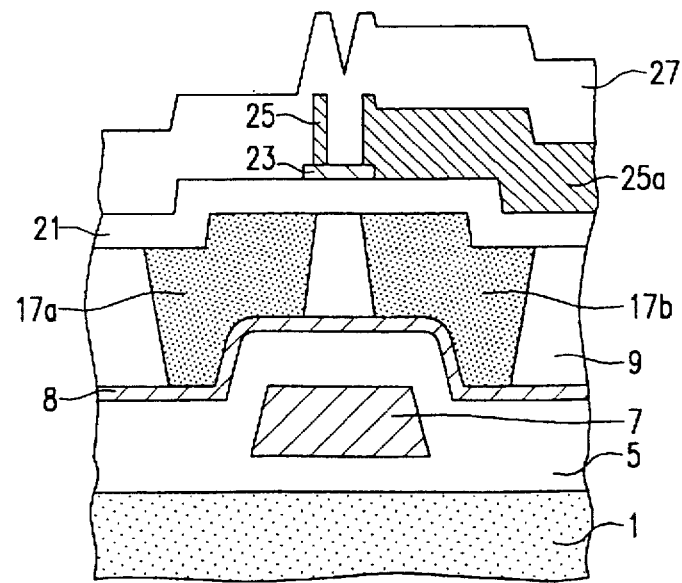

An embodiment of the method according to the invention will be described with reference to FIGS. 1 to 14. This method starts from a plate-shaped substrate 1 of ferrite, in this example a polished NiZn ferrite. An insulation layer 5a of $SiO_2$ is formed, for example by plasma-enhanced chemical vapour deposition (PE CVD) on one of the substrate faces, in this example the substrate face 3a. Subsequently, an adhesive layer 7a of Mo, a layer 7b of Au and an adhesive layer 7c of Mo are successively deposited on the layer 5a in this example by means of, for example sputtering, for forming a test and/or bias winding 7. A photoresist layer is provided, for example by means of spin coating on the joint layers 7a, 7b, 7c. This layer is dried and subsequently exposed, using a suitable photomask. Then the exposed photoresist is developed and removed by rinsing in water. After successive heating and cooling, the layer 7c of Mo is etched, whereafter the unexposed photoresist is removed by means of acetone, and the layer 7b of Au is treated by sputter-etching with an Mo pattern as a mask. The winding 7 is obtained by subsequent etching of the layer 7c of Mo.

An insulation layer 5b of $SiO_2$ is provided by means of, for example PE CVD on the layer 5a which is provided with the winding 7. The layers 5a and 5b jointly constitute a first electrically insulating layer 5 of a non-magnetic material.

An electrically conducting layer 8 of a non-magnetic material is formed on the first electrically insulating layer 5. In this example, this is realised by sputtering an adhesive layer 8a of Mo on the insulation layer 5b and by subsequent sputtering of a layer 8b of Au and an adhesive layer 8c of Mo. The electrically conducting layer 8 serves as a plating base in the method according to the invention.

Subsequently, a second electrically insulating layer 9 of $SiO_2$ of a predetermined thickness corresponding to flux-guiding elements still to be formed is formed on the adhesive layer 8c, for example by means of PE CVD. The second electrically insulating layer 9 is coated with a photoresist layer 10 which is provided with recessed areas 11a and 11b by exposure via a suitable photoresist mask and by subsequent developing, rinsing and drying. Then the recessed areas 11a and 11b are translated to apertures or interruptions 15a and 15b in the second electrically insulating layer 9 by means of etching, particularly chemical etching down to the adhesive layer 8c of Mo. Subsequently, the photoresist layer 10 is removed by means of acetone, and the adhesive layer 8c of Mo is removed by means of, for example etching.

By electrodepositing a soft-magnetic material, for example $Ni_{80}Fe_{20}$, the interruptions 15a and 15b are completely filled up for forming two flux-guiding elements 17a and 17b on the portions 12a and 12b of the electrically conducting layer 8 which have been exposed in the manner described above. During electrodeposition of the soft-magnetic material, the electrically conducting layer functions as a cathode. It has been found that the above-described steps of the method according to the invention can be controlled in such a way that the surface 19 formed by the flux-guiding elements and the second electrically insulating layer 10 hardly shows any differences in height at the material transitions which are present. Measurements have proved that height variations can be maintained within 0.1 µm.

Figure 15:
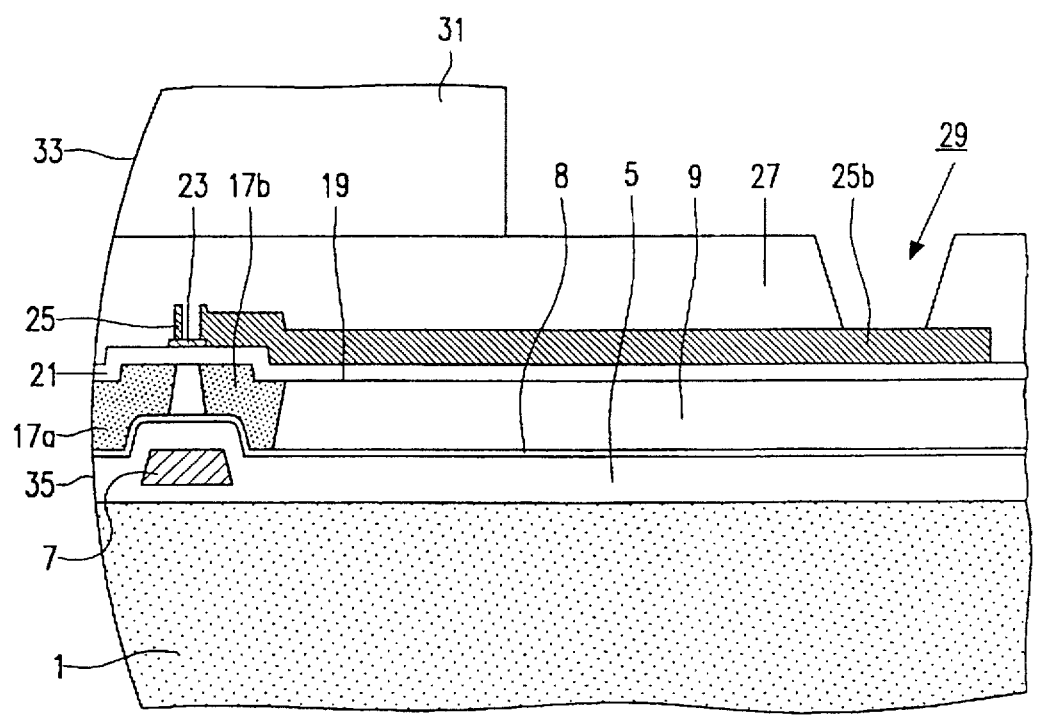
FIG. 15 shows a thin-film magnetic head manufactured by means of the above-mentioned method.

A thin spacer layer 21 of a non-magnetic, electrically insulating material is provided on the surface 19 obtained in the manner described hereinbefore. In this example, quartz is sputtered for this purpose. A layer 23a of a magnetoresistive material is provided on the layer 21, for which purpose an alloy of NiFe is sputtered in this example. The layer 23a is subsequently structured by means of a photoresist mask and etching for forming an MR element 23. A layer 25a of an electrically conducting material, for example Au, is provided on the MR element 23, which layer is structured by means of a photoresist mask and etching to form equipotential strips 25 of a barberpole structure and to form electrically conducting strips 25b for electrically connecting the MR element to a measuring device (not shown). Subsequently an insulation layer 27 of, for example $SiO_2$ is provided by means of, for example sputtering deposition. This insulation layer is etched with apertures 29 extending as far as the conducting strips 25b in order to render electrical connections possible. After planing by, for example polishing of the layer 27, a protective counterblock 31 of, for example $BaTiO_3$ or $CaTiO_3$ is secured by means of, for example an adhesive. The unit then obtained is provided with a head face 33 by operations such as, for example grinding and/or lapping, which head face cooperates with a magnetic recording medium, particularly a magnetic tape. The thin-film magnetic head thus obtained and shown in FIG. 15 has a transducing gap 35 constituted by the electrically insulating layer 5 of a non-magnetic material and the electrically conducting layer 8 of a non-magnetic material.

It is to be noted that the invention is of course not limited to the embodiments shown. For example, the process of forming a test and/or bias winding need not form part of the method. Moreover, the magnetic head may be provided with a transducing element other than the MR element shown. For example, a magnetoresistive element having a barberpole structure may be used.

We claim:

1. A method of manufacturing a thin-film magnetic head provided with a transducing element and at least one flux-guiding element, which method starts from a magnetic substrate, the method characterized in that an electrically conducting layer of a non-magnetic material and a second insulating layer of a non-magnetic material are successively formed on a first electrically insulating layer of a non-magnetic material, said second electrically insulating layer being provided with at least an interruption exposing a portion of said electrically conducting layer, whereafter the flux-guiding element is formed by electrodepositing a soft-magnetic material on said portion until the interruption is filled, whereby the flux-guiding element and the second insulating layer have substantially the same thickness and together form a surface on which an electrically insulating spacer layer is formed, whereafter the transducing element is provided.

2. A method as claimed in claim 1, in which the transducing element is formed from a magnetoresistive material, characterized in that the magnetoresistive material is deposited on the spacer layer.

3. A method as claimed in claim 1, characterized in that the interruption in the second electrically insulating layer is obtained by removal of material.

4. A method as claimed in claim 3, characterized in that the second electrically insulating layer is provided with a further interruption exposing a further portion of the electrically conducting layer, whereafter a soft-magnetic material is electrodeposited in the further interruption for forming a further flux-guiding element.

5. A method as claimed in claim 3, characterized in that a NiFe alloy is used as a soft-magnetic material.

6. A method as claimed in claim 3, characterized in that the substrate is formed from a magnetically permeable material, with the first electrically insulating layer being directly formed on the substrate.

7. A method as claimed in claim 3, in which the transducing element is formed from a magnetoresistive material, characterized in that the magnetoresistive material is deposited on the spacer layer.

8. A method as claimed in claim 1, characterized in that the second electrically insulating layer is provided with a further interruption exposing a further portion of the electrically conducting layer, whereafter a soft-magnetic material is electrodeposited in the further interruption for forming a further flux-guiding element.

9. A method as claimed in claim 8, characterized in that the substrate is formed from-a magnetically permeable material, with the first electrically insulating layer being directly formed on the substrate.

10. A method as claimed in claim 8, characterized in that an NiFe alloy is used as a soft-magnetic material.

11. A method as claimed in claim 8, in which the transducing element is formed from a magnetoresistive material, characterized in that the magnetoresistive material is deposited on the spacer layer.

12. A method as claimed in claim 1, characterized in that a NiFe alloy is used as a soft-magnetic material.

13. A method as claimed in claim 12, characterized in that the substrate is formed from a magnetically permeable material, with the first electrically insulating layer being directly formed on the substrate.

14. A method as claimed in claim 12, in which the transducing element is formed from a magnetoresistive material, characterized in that the magnetoresistive material is deposited on the spacer layer.

15. A method as claimed in claim 1, characterized in that the substrate is formed from a magnetically permeable material, with the first electrically insulating layer being directly formed on the substrate.

16. A method as claimed in claim 15, in which the transducing element is formed from a magnetoresistive material, characterized in that the magnetoresistive material is deposited on the spacer layer.

17. A thin-film magnetic head having a thin-film structure with a head face, for cooperation with a magnetic recording medium, provided on a magnetic substrate, in which head the thin-film structure comprises a composite layer including two spaced flux-guiding elements separated by insulating material, a first electrically insulating layer of non-magnetic material on top of the composite layer and a magnetoresistive element on top of the first electrically insulating layer and bridging the space between said flux-guiding elements, with one of the flux-guiding elements and a transducing gap terminating in the head face, the transducing gap being positioned between said magnetic substrate and said one of the flux-guiding elements the thickness of said transducing gap being the combined thickness of a second electrically insulating layer of a non-magnetic material which together form the transducing gap and an overlying electrically conducting layer of a nonmagnetic material.

* * * * *